(12) United States Patent
Hu et al.

(10) Patent No.: US 10,318,082 B2
(45) Date of Patent: Jun. 11, 2019

(54) TOUCH-SENSING ELECTRONIC DEVICE WITH PRESS-SENSING FUNCTION

(71) Applicant: Touchplus Information Corp., New Taipei (TW)

(72) Inventors: Shih-Hsien Hu, New Taipei (TW); Chi-Chou Ho, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 40 days.

(21) Appl. No.: 15/631,173

(22) Filed: Jun. 23, 2017

(65) Prior Publication Data

US 2017/0371449 A1 Dec. 28, 2017

(30) Foreign Application Priority Data

Jun. 23, 2016 (CN) .......................... 2016 1 0466042

(51) Int. Cl.
*G06F 3/045* (2006.01)
*G06F 3/044* (2006.01)
*G02F 1/155* (2006.01)
*G06F 3/041* (2006.01)

(52) U.S. Cl.
CPC ............. *G06F 3/044* (2013.01); *G02F 1/155* (2013.01); *G06F 3/0412* (2013.01); *G06F 3/0414* (2013.01); *G06F 3/0416* (2013.01); *G06F 2203/04106* (2013.01); *G06F 2203/04112* (2013.01)

(58) Field of Classification Search
None
See application file for complete search history.

(56) References Cited

U.S. PATENT DOCUMENTS

| 2013/0033450 | A1* | 2/2013 | Coulson | G06F 3/044 345/174 |
| 2015/0160762 | A1 | 6/2015 | Hu | |
| 2016/0103542 | A1* | 4/2016 | Ogata | G06F 1/1643 345/174 |
| 2016/0328079 | A1* | 11/2016 | Schwartz | G06F 3/0416 |
| 2017/0262112 | A1* | 9/2017 | Noguchi | G06F 3/044 |
| 2017/0285832 | A1* | 10/2017 | Lee | G06F 3/0414 |

* cited by examiner

*Primary Examiner* — Adam R. Giesy
(74) *Attorney, Agent, or Firm* — WPAT, PC

(57) ABSTRACT

A touch-sensing electronic device with a press-sensing function includes a cover lens formed with a shielding structure at a first side thereof; a display formed with a first group of sensing electrodes and a second group of sensing electrodes at a second side thereof, wherein the second group of sensing electrodes are spaced from and electrically shielded with the shielding structure while the first group of sensing electrodes are unshielded from the shielding structure; and a control chip electrically connected to both the first group of sensing electrodes and the second group. The control chip senses a first capacitance change occurring in response to a touch-sensing operation at a third side of the cover lens, which is opposite to the second side and senses a second capacitance change occurring in response to a press-sensing operation at the third side of the cover lens.

20 Claims, 10 Drawing Sheets

TOUCH-SENSING ELECTRONIC DEVICE WITH PRESS-SENSING FUNCTION

FIELD OF THE INVENTION

The present invention relates to a touch-sensing electronic device, and more particularly to a touch-sensing electronic device with a press-sensing function.

BACKGROUND OF THE INVENTION

Depending on working principles, common touch panels are classified into resistive touch panels and capacitive touch panels. When a user touches a surface of a capacitive touch panel with a finger or a conductive object, the capacitive touch panel would have a capacitance change at the touched site accordingly. The touched position can thus be determined in response to the sensed capacitance change. So far, a so-called two-dimensional capacitive touch panel has been the mainstream technology in the market. Capacitive touch panels have advantages over resistive touch panels, which perform press-sensing operations, for less material damage and capability of multi-touch sensing operations.

However, when operating a conventional capacitive touch panel, the user cannot feel the activation of a key as the key does not actually move in response to the touch. Furthermore, since in the manufacturing process of a conventional two-dimensional capacitive touch panel, it is necessary to take several steps to isolate the two sets of sensing pads in an interleaved portion of each other to form a capacitive sensing component matrix, the manufacturing cost is relatively high. Moreover, it is difficult to integrate such a touch panel into a smartphone or tablet computer structure.

SUMMARY OF THE INVENTION

Therefore, the present invention is to provide a touch-sensing electronic device with a press-sensing function, in which the touch panel can be manufactured and integrated into a smartphone or tablet computer structure in a cost-effective and labor-saving way.

In an aspect of the present invention, a touch-sensing electronic device with a press-sensing function comprises: a cover lens formed with a shielding structure at a first side thereof; a display formed with a first group of sensing electrodes and a second group of sensing electrodes at a second side thereof, wherein the second group of sensing electrodes are spaced from and electrically shielded with the shielding structure while the first group of sensing electrodes are unshielded from the shielding structure; and a control chip electrically connected to both the first group of sensing electrodes and the second group of sensing electrodes for sensing a first capacitance change occurring in response to a touch-sensing operation at a third side of the cover lens, which is opposite to the first side, and sensing a second capacitance change occurring in response to a press-sensing operation at the third side of the cover lens.

In another aspect of the present invention, a touch-sensing electronic device with a press-sensing function comprises: a display formed with a first group of sensing electrodes at a first side thereof, wherein a portion of the first group of sensing electrodes function for touch sensing in a first mode, and function for press sensing as a shielding structure in a second mode; a soft substrate having a first end thereof coupled to the display; a bottom case coupled to a second end of the soft substrate; a second group of sensing electrodes formed at a second side of the soft substrate, and spaced from and electrically shielded with the shielding structure; a control chip electrically connected to both the first group of sensing electrodes and the second group of sensing electrodes for sensing a first capacitance change occurring in response to a touch-sensing operation on or over the first group of sensing electrodes, and sensing a second capacitance change occurring in response to a press-sensing operation on or over the second group of sensing electrodes

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is to be noted that the term "touch-sensing" or "touch-sensitive" means not only to be sensitive to a sliding or touching gesture actually acting on a specified surface but also sensitive to an air gesture floatingly acting over the specified surface. The air gesture may be a vertically moving action and/or a horizontally moving action within a specified range, or a holding-still action for a specified period of time. The horizontally moving action, for example, moves a cursor on the controlled device; the vertically moving action (movement in Z-axis), for example, simulates a pressing operation on a virtual key; and the holding-still action, for example, wakes the touch-sensitive keypad control device up from a suspension or sleep state. Hereinafter, fingers are exemplified as the tool for executing the gestures. However, any other suitable tool capable of conducting a capacitance change may be used depending on practical requirements and size of the touch-sensitive keypad control device. For example, palms or conductive objects may also be used instead.

Figure 1A:
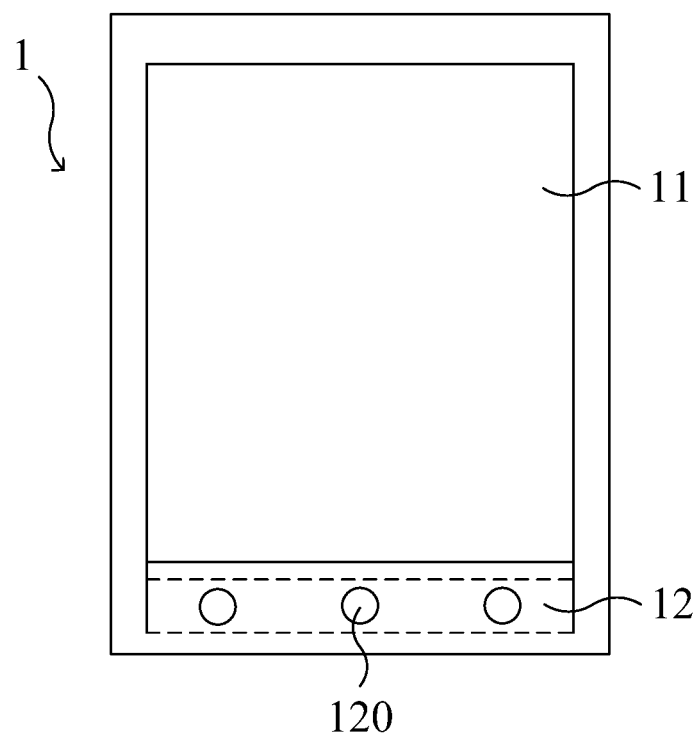
FIG. 1A is a schematic top-plane view of a smartphone.

Please refer to FIG. 1A. As shown, a top plane of a smartphone 1 includes two regions, i.e. a display region 11 and a functional key region 12. The display region 11 mainly functions for showing images, and by triggering one of the functional keys 120 in the functional key region 12, e.g. home button, back button or recent app button, a corresponding function will be executed. Generally, the display region 11 is implemented with a touch-sensitive liquid crystal display (LCD) or any other suitable touch-sensitive planar display, and the functional keys 120 in the functional key region 12 may be physical buttons or virtual keys.

Figure 1B:
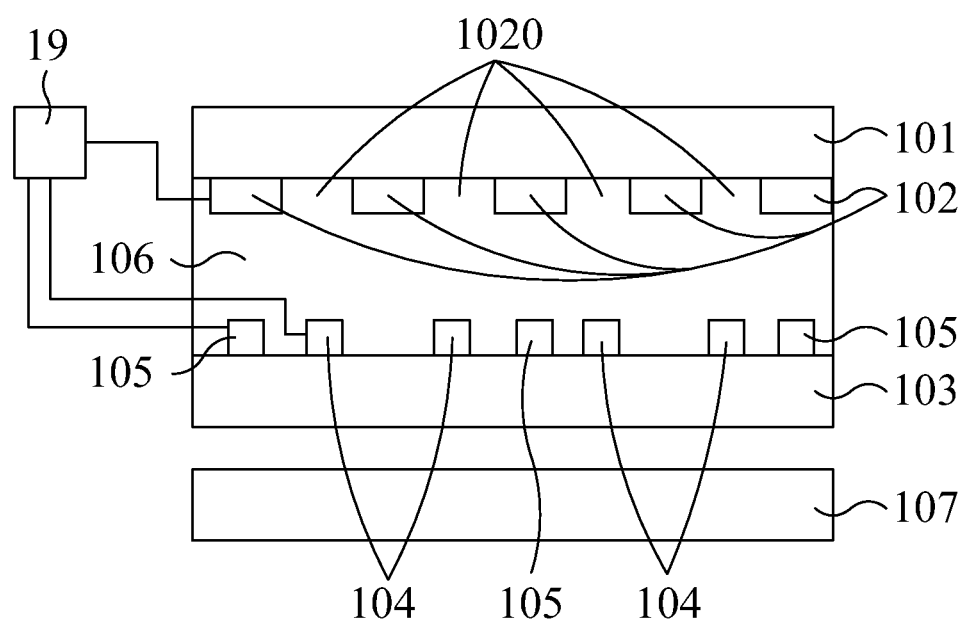
FIG. 1B is a schematic cross-sectional view of an embodiment of a smartphone as illustrated in FIG. 1A.

FIG. 1B schematically illustrates a sensing circuit of the smartphone 1 as illustrated in FIG. 1A according to an embodiment of the present invention. The structure of the smartphone 1 includes a cover lens 101, a display module 103 and a bottom case 107. The cover lens 101, for example, is a light-transmissive glass substrate. The cover lens 101 and the display module 103 are combined with each other by way of an optical clean adhesive (OCA) layer 106. Alternatively, the cover lens 101 may be disposed over the display module 103 by way of a local spacer (not shown) so that an air gap is created between the cover lens 101 and the display module 103. The bottom case 107 accommodates a backlight module and a main board of the LCD module 103.

The sensing circuit of the smartphone 1 includes a touch-sensing device 104 and a press-sensing device 105, both of which are electrically connected to a control chip 19. The control chip 19 may be disposed in the LCD module 103 or any other suitable place such as the case 107. The sensing circuit further includes a shielding structure arranged on a lower surface of the cover lens 101, facing the LCD module 103 and including a plurality of shielding parts 102 separated with gaps 1020. The allocation of the shielding parts 102 covers the press-sensing device 105, while the allocation of the gaps 1020 expose the touch-sensing device 104 from the shielding structure. In response to a touch-sensing operation, e.g. a sliding operation on the cover lens 101 or an air gesture above the cover lens 101, a first capacitance change would occur in the touch-sensing device 104 at a position corresponding to the site where the sliding operation or air gesture is conducted. Alternatively, in response to a press-sensing operation, e.g. pushing the cover lens 101 downward to have the shielding part 102 approach the press-sensing device 105, a second capacitance change would occur in the press-sensing device 105 at a position corresponding to the site where the pushing operation is conducted. In response to the first capacitance change or the second capacitance change, the control chip 19 determines whether and where touch or depression is performed. The working principles of the sensing circuit and the control chip 19 will be described in more detail later.

Figure 2:
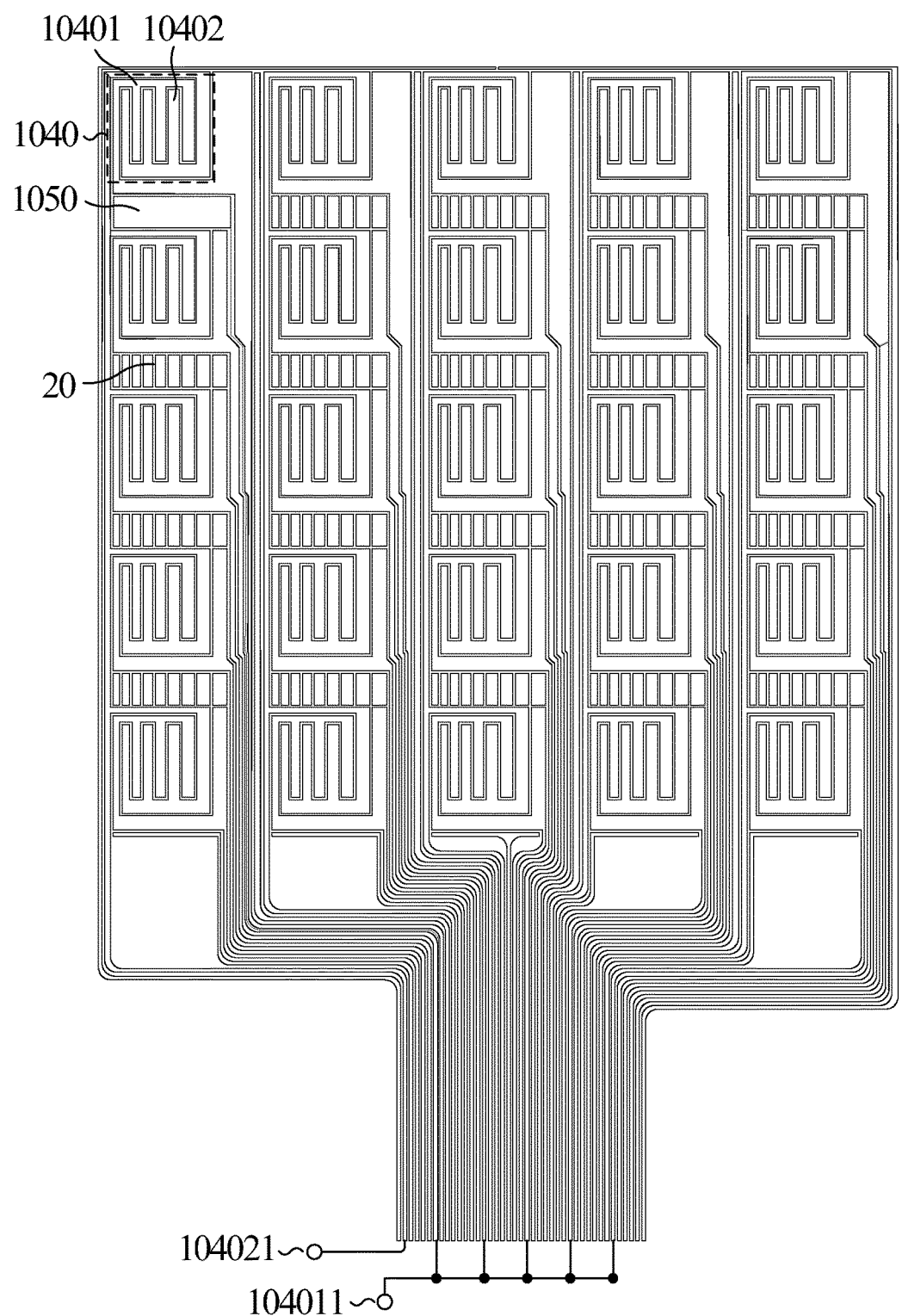
FIG. 2 is a schematic layout of a portion of a touch-sensing and press-sensing circuit of a touch panel, which is formed on an upper surface of a display module, according to an embodiment of the present invention.
Figure 3A:
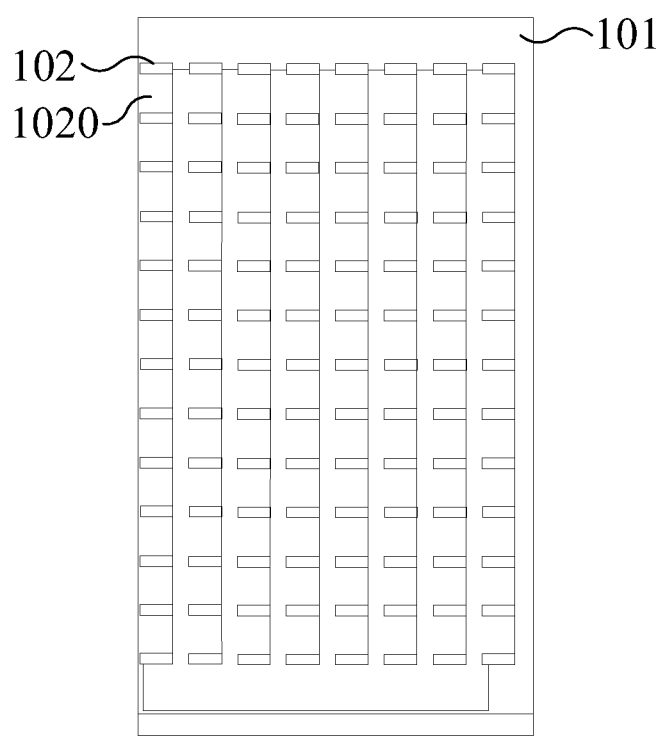
FIG. 3A is a schematic layout of another portion of the touch-sensing and press-sensing circuit of the touch panel as illustrated in FIG. 2, which is formed on a lower surface of a cover lens of the touch panel.
Figure 3B:
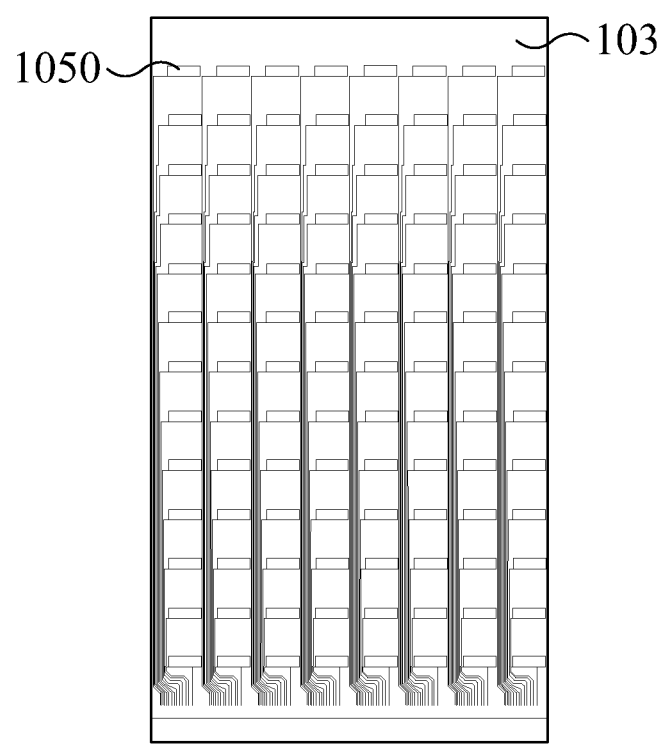
FIG. 3B is a schematic layout of the press-sensing circuit part formed on the upper surface of the display module as shown in FIG. 2.

Please refer to FIGS. 2, 3A and 3B, in which partial layout schemes of the sensing circuit according to an embodiment of the present invention are illustrated. As shown, the touch-sensing device 104 includes M*N capacitive sensing units 1040 disposed in the display region 11 and arranged in an array, e.g. a 5*5 array. Each of the 5*5 capacitive sensing units 1040 is formed with a first sensing electrode 10401 and a second sensing electrode 10402. Via the first signal input/output terminal set 104011 including at least five signal input/output terminals, at least five first sensing electrodes 10401 are electrically connected to each other in parallel. Meanwhile, via the second signal input/output terminal set 104021 including at least five signal input/output terminals, at least five second sensing electrodes 10402 are electrically connected to each other. In each of the 5*5 capacitive sensing units 1040, the first sensing electrode 10401 and the second sensing electrode 10402 are coplanar and form a juxtaposition zone. The examples of the juxtaposition zone and the working principles of the touch-sensing device 104 can be referred to Taiwanese Patent Publication No. TW201523413, Chinese Patent Publication No. CN104714708A, and U.S. Patent Publication No. U.S. 20150160762A1, which are assigned to the same assignee and incorporated herein for reference and would not be redundantly described herein. It is to be noted that the shielding parts 102 and the electrodes 10401, 10402 and 1050 do not have to be directly formed on the cover lens 101 or the LCD module 103. For example, the shielding parts 102 may be formed on an additional element disposed between the cover lens 101 and the LCD module 103, and the electrodes 10401, 10402 and 1050 may be formed the one or another additional element disposed between the cover lens 101 and the LCD module 103 as long as the shielding parts 102 are spaced from and electrically shield the press-sensing electrodes 1050.

Furthermore, every adjacent capacitive sensing units are spaced with a non-routing area 20. Nevertheless, the non-routing area 20 may be optionally formed with dummy transparent wires in order to visually unify the layout. Alternatively, some or all the non-routing area 20 may be formed with electrodes 1050 of the press-sensing device 105, depending on practical designs. The capacitive sensing unit 1040 and corresponding routings can be made of a transparent material. The electrodes 1050, the first and second sensing electrodes 10401 and 10402 of the capacitive sensing units 1040, as well as the routing structure, may be formed with the same material in the same manufacturing process. Therefore, the manufacturing process is simplified. Furthermore, the above-described transparent material for forming the electrodes may be made of indium tin oxide (ITO), and the electrodes may be defined with a masking and microlithographic process. If the line widths of the first and second sensing electrodes 10401 and 10402 of the capacitive sensing units 1040 and the corresponding routing structure are large enough, the manufacturing process may be replaced with a relatively cost-effective printing process.

Furthermore, the control chip is electrically connected to the electrodes of the capacitive sensing units, e.g. via the first signal input/output terminal set 104011 and the second signal input/output terminal set 104021, and the electrodes 1050 of the press-sensing electrode 105. The touch-sensing device 104, in response to a touch-sensing operation such as a sliding operation or an air gesture, generates a first capacitance change at a position corresponding to the site where the sliding operation or air gesture is conducted. The press-sensing device 105, in response to a press-sensing operation such as downward movement of the shielding part 102 relative to an electrode of the press-sensing device 105, a second capacitance change would occur in the press-sensing device 105 at a position corresponding to the site where the pushing operation is conducted. In response to the first capacitance change or the second capacitance change, the control chip determines whether and where touch or depression is performed. Therefore, both touch sensing and press sensing can be conducted with such a simple interface.

Please refer to FIG. 3A, the shielding structure 102 provided on a lower surface of the cover lens 101 is schematically illustrated. The shielding structure 102 may be formed of a transparent conductive material such as ITO by way of a masking and microlithographic process. In this embodiment, the shielding structure 102 consists of 8*13 shielding parts 1020 allocated as an array. The 8*13 shielding parts 1020 are aligned with the electrodes 1050 of the underlying press-sensing device 105, which is schematically illustrated in FIG. 3B, for electrically shielding the press-sensing device 105 from the capacitive coupling effect of the user's finger or the conductive object while the touch-sensing device 104 is working with the user's finger or the conductive object through the gaps 1020. On the other hand, when the user's finger or the conductive object presses specific sites on the cover lens 101 where the electrodes 1050 are disposed, the cover lens 101 deforms so as to push the shielding part 1020 at the pressed site toward the electrode 1050 aligned therewith. Accordingly, a capacitance change occurs to show a press-sensing result. Furthermore, the shielding parts 1020 are electrically interconnected and supplied with a default voltage. The default voltage may be a constant voltage, e.g. a ground voltage, or a dynamically adjusted voltage. By dynamically adjusting the default voltage to be synchronized with the sensing voltage, the capacitive effect and thus the sensitivity of the touch-sensing device 104 can be improved. The examples of the default voltage and the working principles of the touch-sensing device 104 can also be referred to Taiwanese Patent Publication No. TW201523413, Chinese Patent Publication No. CN104714708A, and U.S. Patent Publication No. U.S. 20150160762A1, which are assigned to the same assignee and incorporated herein for reference and would not be redundantly described herein.

Figure 4:
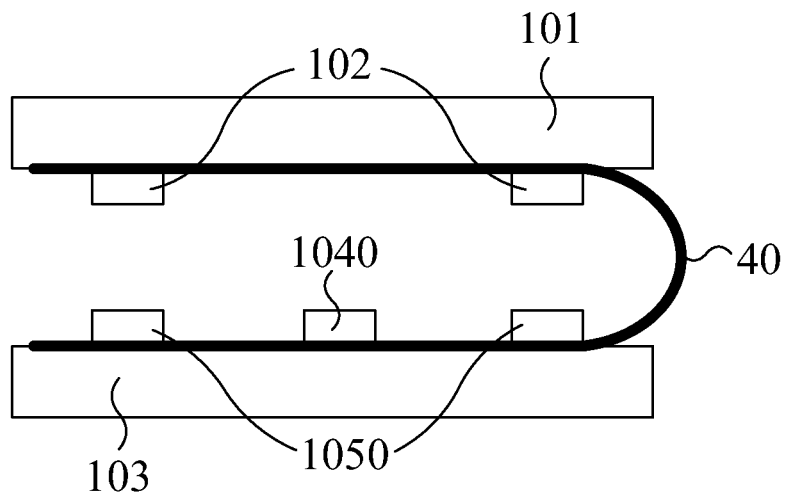
FIG. 4 is schematic cross-sectional view of a partial touch-sensing and press-sensing circuit of a touch panel according to another embodiment of the present invention.
Figure 5:
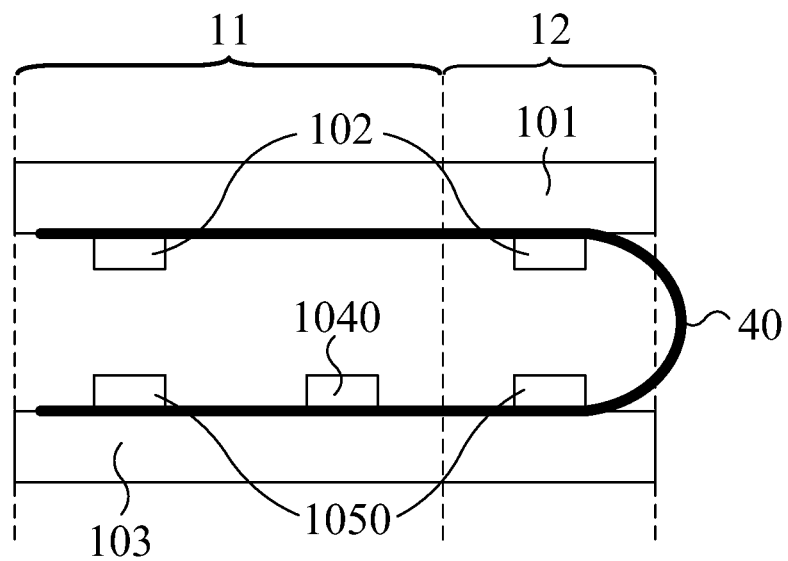
FIG. 5 is schematic cross-sectional view of a partial touch-sensing and press-sensing circuit of a touch panel according to a further embodiment of the present invention.

The shielding parts 1020 of the shielding structure 102, the first and second sensing electrodes 10401 and 10402 of the capacitive sensing units 1040, the electrodes 1050 and associated traces may be formed on the same surface of a soft transparent substrate. This is advantageous in manufacturing and assembling the elements. As shown in FIGS. 4 and 5, by properly disposing the shielding parts 1020 of the shielding structure 102, the first and second sensing electrodes 10401 and 10402 of the capacitive sensing units 1040, the electrodes 1050 and associated traces on a soft transparent substrate 40 and properly bending the soft transparent substrate 40 to have the elements well aligned, the sensing circuit can be readily produced after securing opposite portions of the bent soft transparent substrate 40 onto the lower surface of the cover lens 101 and the upper surface of the display module 103, respectively.

In the embodiment as illustrated in FIG. 4, the functional key region 12 as shown in FIG. 1 is integrated into the display region 11, so the sensing electrodes 10401 and 10402 and the electrodes 1050 are all disposed in the display region. In contrast, in the embodiment as illustrated in FIG. 5, some of the electrodes 1050 of the press-sensing device 105 are disposed in the functional key region 12 outside the display region 11 for functional-key actuation.

Figure 6A:
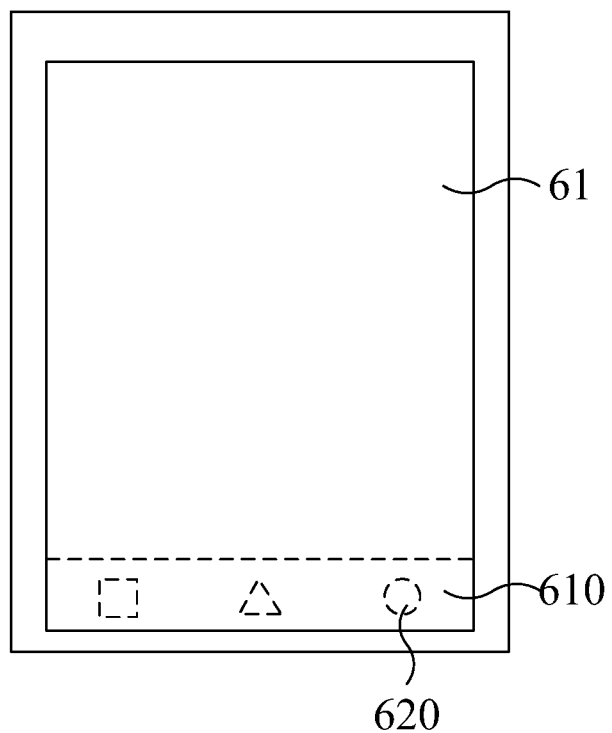
FIG. 6A is a schematic top-plane view of another smartphone.

Please refer to FIG. 6A, in which a smartphone according to another embodiment of the present invention is schematically illustrated. The smartphone 6 is a borderless or thin border phone. In other words, a display region 61 substantially occupies all the upper surface of the smartphone 6. Therefore, it is not proper to mount physical buttons for use as the functional keys any more. In contrast, it is preferable to integrate the functional key region into the display region, and the display module is integrated with touch-sensing means. The functional key region 610 occupies a small area of the display region 61, and is configured with several virtual buttons 620, whose shapes may be variably displayed under different applications, depending on practical designs, and which may be hidden for full screen display.

Figure 6B:
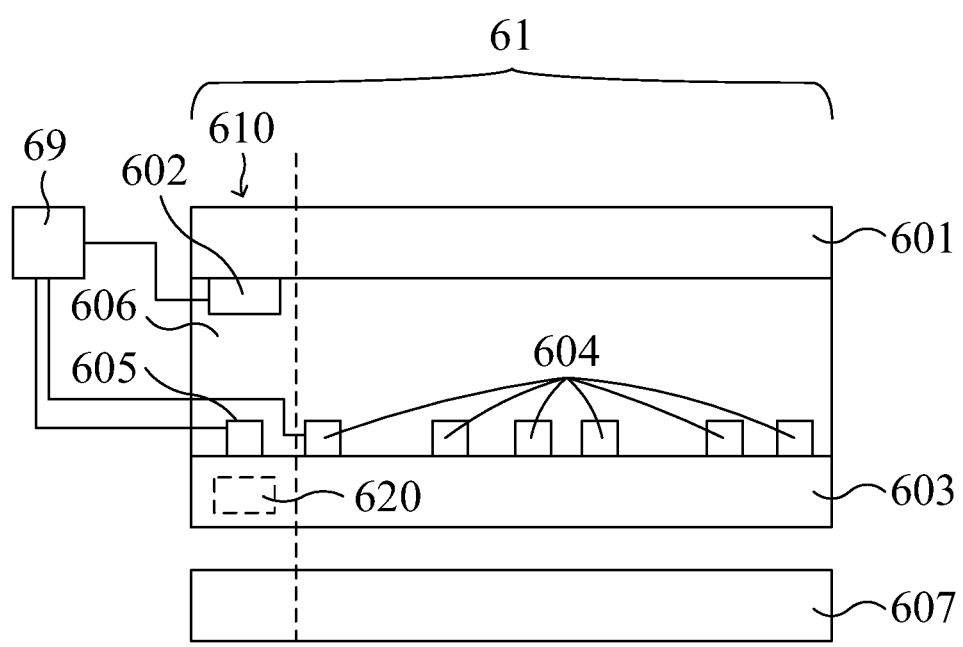
FIG. 6B is a schematic cross-sectional view of an embodiment of the smartphone as illustrated in FIG. 6A.

FIG. 6B schematically illustrates an exemplified sensing circuit of the smartphone 6. The structure of the smartphone 6 includes a cover lens 601, a display module 603 and a bottom case 607. The cover lens 601 and the display module 603 are combined with each other by way of an optical clean adhesive (OCA) layer 606. Alternatively, the cover lens 601 may be disposed over the display module 603 by way of a local spacer (not shown) so that an air gap is created between the cover lens 601 and the display module 603. The bottom case 607 accommodates a backlight module and a main board of the LCD module 603.

The sensing circuit of the smartphone 6 includes a touch-sensing device 604 and a press-sensing device 605, both of which are electrically connected to a control chip 69. The control chip 69 may be disposed in the LCD module 603 or any other suitable place. The sensing circuit further includes a shielding structure arranged on a lower surface of the cover lens 601, facing the LCD module 603 and including one or more shielding parts 602. In this embodiment, the touch-sensing device 604 includes a plurality of capacitive sensing units provided on the display region 61 for touch sensing. In response to a touch-sensing operation, e.g. a sliding operation on the cover lens 601 or an air gesture above the cover lens 601, a first capacitance change would occur in the touch-sensing device 604 at a position corresponding to the site where the sliding operation or air gesture is conducted. On the other hand, the press-sensing device 605 includes one or more electrodes provided on the display region 61 at an edge of the display region 61, and aligned with and covered by the corresponding one or more shielding parts 602. In response to a press-sensing operation, e.g. pushing the cover lens 601 downward to have the shielding part 602 approach the press-sensing device 605, a second capacitance change would occur in the press-sensing device 605 at a position corresponding to the site where the pushing operation is conducted. Then the activated functional key is shown by the display module 603. In response to the first capacitance change or the second capacitance change, the control chip 69 determines whether and where touch or depression is performed.

Figure 7:
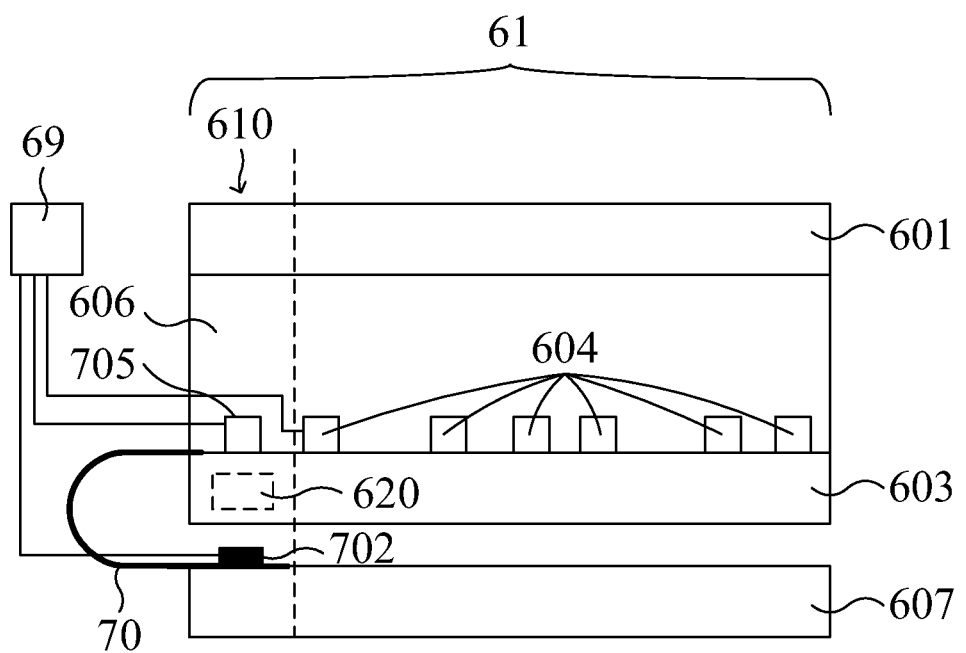
FIG. 7 is a schematic cross-sectional view of another embodiment of the smartphone as illustrated in FIG. 6A.

FIG. 7 schematically illustrates another embodiment of the smartphone as illustrated in FIG. 6A. In the embodiment illustrated in FIG. 6B, the functional keys 620 in the functional key region 610 are implemented with shielding parts 602 and electrodes 605 aligned with each other. In this embodiment, the shielding parts 602 are removed and one or more additional electrodes 702 are provided on an upper surface of the case 607 under the display module 603. Thus, the press-sensing electrodes 605 illustrated in FIG. 6B are replaced with unshielded electrodes 705, which function as both touch-sensing electrodes and a shielding structure. The control chip 69 controls the sensing circuit to be switched between a press-sensing mode and a touch-sensing mode in a time-division multiplexing manner. In the touch-sensing mode, the electrodes 705 function as touch-sensing electrodes, and work like the electrodes 604. In the press-sensing mode, the electrodes 705 are disabled from the touch-sensing function and function as shielding parts for electrically shielding the press-sensing electrodes 702 from the capacitive coupling effect of the user's finger or the conductive object while the user's finger or the conductive object is pressing on the cover lens 601 at the functional key region 610.

In more detail, in a first period of time, the electrodes 705 are made to be in an electrically floating state by the control chip 69, and thus function as the shielding parts. The control chip 69 determines whether and which functional key is actuated by sensing capacitance of the press-sensing electrodes 702. If a capacitance change occurs as one of the shielding parts 705 is pushed toward the corresponding electrode 702, a press-sensing action is determined. On the other hand, if a second period of time, the electrodes 705 are coupled to a sensing voltage, just like the electrodes 1040, the control chip 69 determines whether and which site of the display region 61 is touched by sensing capacitance of the touch-sensing electrodes 604 and 705.

In this embodiment, the press-sensing electrodes 702 are formed in only the functional key region 610. The press-sensing electrodes 702 are formed on a surface of a soft substrate 70. The soft substrate 70 is bent to have one end thereof secured onto the display module 603, for example attached onto the same upper surface of the display module as the surface where the electrodes 705 and 604 are formed, and have another end secured onto the upper surface of the case 607 with the press-sensing electrodes 702 facing the electrodes 705. The soft substrate 70 may be a flexible printed circuit (FPC), which further electrically connects the signal pins of the touch-sensing device, e.g. the first signal input/output terminal set 104011 and the second signal input/output terminal set 104021, to the signal pins in the case 607 (not shown).

Figure 8:
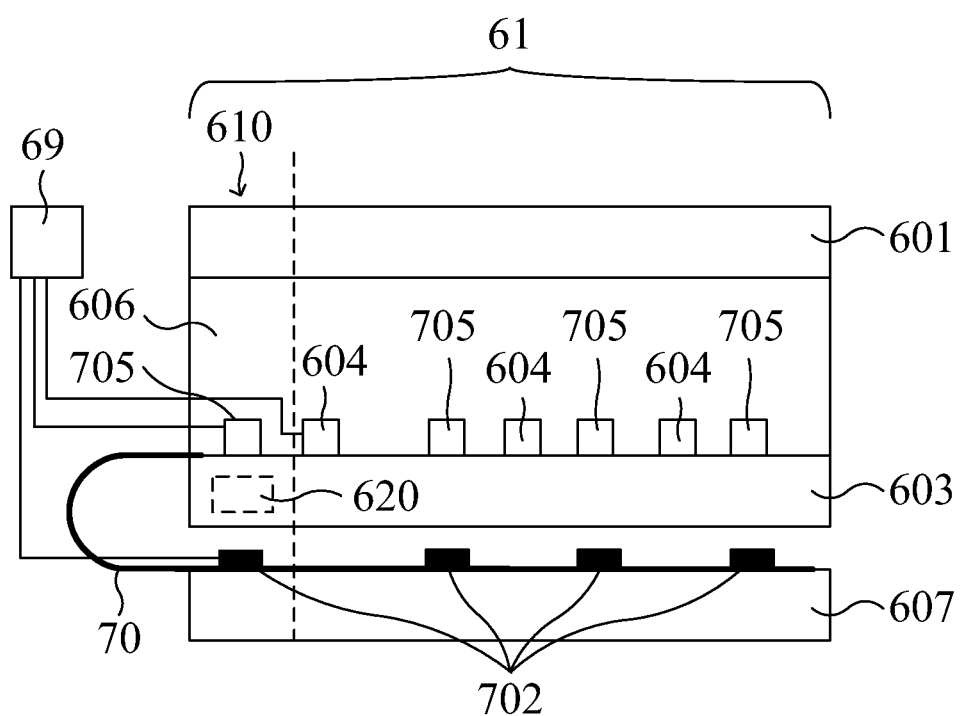
FIG. 8 is a schematic cross-sectional view of a further embodiment of the smartphone as illustrated in FIG. 6A.

In an alternative embodiment as illustrated in FIG. 8, the press-sensing electrodes 702 are not only disposed in the functional key region 610. Instead, the press-sensing electrodes 702 are distributed in the entire display region 61. In other words, the press-sensing function can be performed all over the display region 61. In this embodiment, the soft substrate 70 are formed with a plurality of the electrodes 702 distributed in the display region 61.

Although a smartphone is exemplified as the electronic device according to the present invention, those who are skilled in the art would realize that the electronic device may also be any other suitable device with touch-sensitive functions. Furthermore, although an LCD module is exemplified as the display module in all of the above-described embodiments, those who are skilled in the art would realize that the electronic device may also be any other suitable display such as an electronic paper display or an organic light-emitting diode (OLED) display may also be used in the electronic device according to the present invention.

To sum up, by properly allocating the sensing electrodes and the shielding structure, a touch-sensing electronic device according to the present invention can further perform a press-sensing function and can be manufactured in a cost-effective and labor-saving manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch-sensing electronic device with a press-sensing function, comprising:
    a cover lens formed with a shielding structure;
    a display covered by the cover lens and formed with a first group of sensing electrodes and a second group of sensing electrodes, wherein the second group of sensing electrodes are spaced from and electrically shielded with the shielding structure while the first group of sensing electrodes are unshielded from the shielding structure; and
    a control chip electrically connected to both the first group of sensing electrodes and the second group of sensing electrodes for sensing a first capacitance change occurring with the first group of sensing electrodes in response to a touch-sensing operation at the cover lens, and sensing a second capacitance change occurring with the second group of sensing electrodes in response to a distance change between the shielding structure and the second group of sensing electrodes, which is caused by a press-sensing operation at the cover lens toward the display.

2. The touch-sensing electronic device according to claim 1, wherein the cover lens is a light-transmissive glass substrate, the shielding structure is formed of a transparent conductive material and includes a plurality of shielding parts separated with gaps, wherein the shielding parts are aligned with the second group of sensing electrodes, and the first group of sensing electrodes are uncovered from the shielding parts.

3. The touch-sensing electronic device according to claim 1, wherein the first group of sensing electrodes and the second group of sensing electrodes are formed of a transparent conductive material.

4. The touch-sensing electronic device according to claim 3, wherein the first group of sensing electrodes includes:
    M*N first sensing electrodes;
    a first signal input/output terminal set consists of M signal input/output terminals, each of which is electrically connected to N first sensing electrodes in parallel;
    M*N second sensing electrodes; and
    a second signal input/output terminal set consists of N signal input/output terminals, each of which is electrically connected to M second sensing electrodes,
    wherein the first sensing electrodes and the second sensing electrodes are coplanar, and each of the first sensing electrodes forms a juxtaposition zone with a corresponding one of the second sensing electrodes.

5. The touch-sensing electronic device according to claim 4, wherein the second group of sensing electrodes are formed in a non-routing area between adjacent juxtaposition zones.

6. The touch-sensing electronic device according to claim 1, further comprising an optical clean adhesive layer disposed between the first side of the cover lens and the display for coupling the cover lens to the display.

7. The touch-sensing electronic device according to claim 6, wherein the cover lens is deformable in response to the press-sensing operation.

8. The touch-sensing electronic device according to claim 1, wherein the control chip is disposed in the display or a bottom case of the touch-sensing electronic device, which is disposed under the display and accommodates therein a backlight module and a main board of the display.

9. The touch-sensing electronic device according to claim 1, wherein the shielding structure is supplied with a default voltage, which is a constant voltage or a dynamically adjusted voltage.

10. The touch-sensing electronic device according to claim 1, wherein the second group of sensing electrodes are disposed in a functional key region of the touch-sensing electronic device and function for press sensing.

11. The touch-sensing electronic device according to claim 10, wherein the functional key region occupies a part of a display region of the touch-sensing electronic device.

12. The touch-sensing electronic device according to claim 10, wherein the functional key region is disposed outside a display region of the touch-sensing electronic device.

13. The touch-sensing electronic device according to claim 1, wherein the second group of sensing electrodes are distributed all over a display region of the touch-sensing electronic device for press sensing.

14. The touch-sensing electronic device according to claim 13, wherein a functional key region occupies a part of the display region of the touch-sensing electronic device, and functional keys in the functional key region are variably displayed.

15. The touch-sensing electronic device according to claim 1, wherein the second group of the sensing electrodes functioning for press sensing are formed on a soft and bendable substrate, and one end of the soft and bendable substrate is secured onto the display at the second side.

16. The touch-sensing electronic device according to claim 15, wherein the first group of the sensing electrodes functioning for touch sensing are formed on the same surface of the soft and bendable substrate as the second group of the sensing electrodes, and another end of the soft and bendable substrate is secured onto the cover lens at the first side.

17. A touch-sensing electronic device with a press-sensing function, comprising:
a display formed with a first group of sensing electrodes at a first side thereof, wherein a portion of the first group of sensing electrodes function for touch sensing in a first mode, and function for press sensing as a shielding structure in a second mode;
a soft substrate having a first end thereof coupled to the display;
a bottom case coupled to a second end of the soft substrate;
a second group of sensing electrodes formed at a second side of the soft substrate, and spaced from and electrically shielded with the shielding structure;
a control chip electrically connected to both the first group of sensing electrodes and the second group of sensing electrodes for sensing a first capacitance change occurring in response to a touch-sensing operation on or over the first group of sensing electrodes, and sensing a second capacitance change occurring in response to a press-sensing operation on or over the second group of sensing electrodes.

18. The touch-sensing electronic device according to claim 17, wherein the first mode and the second mode are switched in a time-division multiplexing manner.

19. The touch-sensing electronic device according to claim 17, wherein the second group of sensing electrodes are disposed in a functional key region of the touch-sensing electronic device.

20. The touch-sensing electronic device according to claim 17, wherein the second group of sensing electrodes are distributed all over a display region of the touch-sensing electronic device.

* * * * *